United States Patent [19]

Wallsten

[11] 4,367,079

[45] Jan. 4, 1983

[54] UNIT CONTAINING SORBENT MATERIAL

[76] Inventor: Hans I. Wallsten, Chemin de la Lisiere 6, Lausanne, Switzerland, CH-1018

[21] Appl. No.: 144,874

[22] Filed: Apr. 29, 1980

[30] Foreign Application Priority Data

Apr. 30, 1979 [SE] Sweden ............................. 7903788
Nov. 1, 1979 [SE] Sweden ............................. 7909062

[51] Int. Cl.³ ............................................ B01D 53/04
[52] U.S. Cl. ...................................... 55/208; 55/387
[58] Field of Search .................... 55/208, 387, 389; 62/271, 480; 210/289

[56] References Cited

U.S. PATENT DOCUMENTS

| | | | |
|---|---|---|---|
| 2,019,356 | 10/1935 | Normelli | 62/480 |
| 2,626,675 | 1/1953 | Maher | 210/289 X |
| 3,296,773 | 1/1967 | Hemstreet | 55/208 X |
| 3,338,034 | 8/1967 | Hemstreet | 55/389 X |
| 3,498,024 | 3/1970 | Calvert, Sr. | 55/389 X |
| 3,528,224 | 9/1970 | Warn | 55/208 X |
| 3,638,403 | 2/1972 | Delacour et al. | 55/389 |
| 3,678,662 | 7/1972 | Grote | 55/387 |
| 3,734,293 | 5/1973 | Biskis | 55/208 X |
| 3,844,737 | 10/1974 | Macriss et al. | 55/389 X |
| 3,853,519 | 12/1974 | York, Jr. | 55/387 |

FOREIGN PATENT DOCUMENTS 1901926 4/1970 Fed. Rep. of Germany .
7714224 12/1977 Sweden .

Primary Examiner—Robert H. Spitzer
Attorney, Agent, or Firm—Brumbaugh, Graves, Donohue & Raymond

[57] ABSTRACT

A unit containing sorbent material intended for use as a thermal accumulator in a heat storage or refrigeration system operating under low pressure is manufactured by tightly enclosing sorbent material in a flexible, relatively thin casing (2,13,57,58,75,84,95,96). The casing is brought into close contact with the sorbent material in the casing by maintaining the pressure within the casing at a much lower level than the ambient pressure. This provides a rigid body and achieves satisfactory thermal conductivity. The casing is also designed to be sealingly connected to at least one inlet and/or outlet (3,15,16,37,61,82,83,106,107) for a gaseous substance cooperating with said sorbent material. The sorbent can be hermetically enclosed in a common casing composed of several casing parts, the wall parts of adjacent casing parts being joined in zones (97) in which internal passages (103–105) are arranged. As well as this, spaces (109) may be arranged between adjacent units forming through-flow channels for an external gaseous or liquid medium for the supply or removal of heat. The spaces (109,112,115) are provided, for instance, by means of spacers (110) arranged between adjacent casing parts (96,96a), some of said spacers also communicating with the inside of adjacent casing parts and thus also cooperating with spacer (116) for the gas to be absorbed or released, arranged in the casing parts.

17 Claims, 26 Drawing Figures

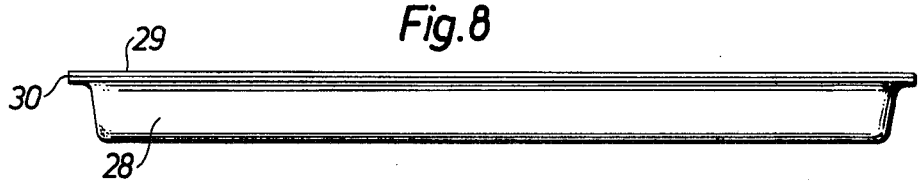
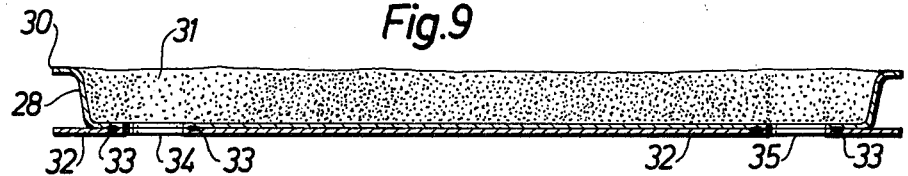
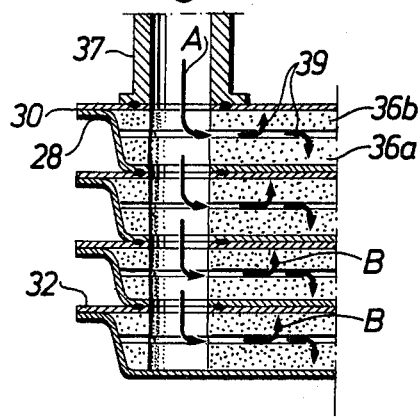
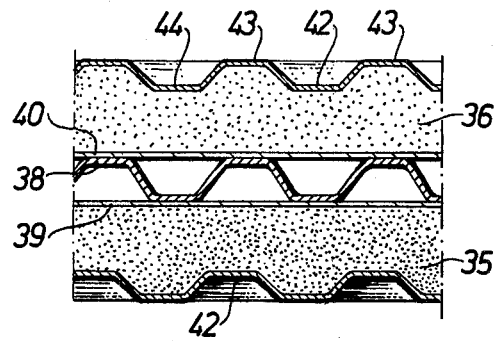
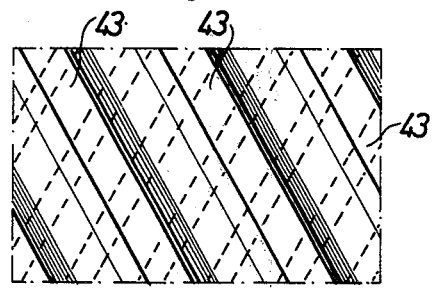

UNIT CONTAINING SORBENT MATERIAL

BACKGROUND TO THE INVENTION

The present invention relates to a method of manufacturing units containing sorbent material. Such units may be intended for use as thermal accumulator elements for a heating or refrigeration system. The invention also relates to units manufactured by such a method.

It has been long known to use materials that are known as "sorbents" especially in connection with refrigeration. In certain refrigeration processes a sorbent is utilised which consists of a solid substance that absorbs a sorption medium in gaseous form as a reversible exothermic reaction. For example calcium chloride may be used as a sorbent with water as sorption medium. In a slightly different case the refrigeration process is effected by means of an adsorption. An example of this method is the use of zeolite as a sorbent and water vapour as a sorption medium. In both these cases a solid substance is used as a sorbent, and the process is reversible. Thus initially the sorption occurs with the development of heat. Subsequently this process is effectively reversed and the sorption medium is removed from the sorbent by supplying heat.

It has been proposed that the same or similar sorption processes can be used for other purposes, for example for storing heat derived from solar energy. An example of a system that has a heat storage capability is a chemical thermal pump which consists of two communicating vessels, one vessel containing a sorbent on which the sorption medium is adsorbed or absorbed. By a suitable selection of sorbent and sorption medium a cyclic process can be achieved. The first mentioned vessel with the sorbent, is supplied with heat, for example by contacting the vessel with warm water from a solar energy collector. As heat is supplied, in an endothermic process the sorption medium is evaporated off from the sorbent in gaseous form and subsequently condenses in the second vessel while emitting a certain amount of heat. When all the sorption medium has been evaporated from the sorbent the thermal pump can be considered to be a thermal accumulator which is fully charged. During the next cycle the condensate in the second vessel is caused to vaporize by supplying what is known as "low-temperature" heat and is sorbed into the sorbent, thus giving off substantial quantities of heat at a higher temperature than the "low-temperature" heat.

Many different combinations of sorbents and sorption medium have been suggested for heat storage devices that operate in this, or a similar manner. In most cases substances have been suggested for the sorbent which are in solid form during most of the process. Examples of such substances are various salt hydrates, in which case the sorption medium is water vapour; ammoniates, in which case the sorption medium is ammonium; and zeolites, in which can the sorption medium can be water.

The general conditions for commercial suitability of a sorption process, whether for refrigeration or heat storage, for instance, are amongst other things, that the sorbent and sorption medium are both inexpensive, not damaging if released to the environment and capable of undergoing repeated cycles of use without deteriorating in any way. Partly for these reasons the greatest interest in heat storage has been associated with salt hydrates with water as sorption medium, but other combinations have been tested.

In most cases the sorption processes requires the substantial absence of air if the process is to be sufficiently quick to be useful. For both refrigeration and the storage of heat for example, in the original form of solar energy, this generally means that the processes must take place in a partial vacuum in relation to atmospheric pressure. If, for instance, when using a chemical heat pump which employs a salt hydrate and water, it is desired to make use of "low-temperature" heat which may have a temperature of about 5° C., in order to evaporate water which is then to be sorbed by a salt hydrate, for instance, which will then develop heat at a temperature of perhaps 40°-60° C., the pressure in the system (i.e. the partial pressure of the water vapour) will have to be between perhaps 6 and 10 torr. Corresponding ammoniate systems and zeolite systems also usually require low pressure.

When storing heat by the week or seasonally in order to utilize solar energy in a practical manner, by a sorbent method the quantity of sorbent needed will be considerable. A theoretical calculation indicates, for instance, that in order to store 7000 kWh, using calcium chloride as sorbent and water vapour as sorption medium, 15 tons of the salt would be needed if practical extraction temperatures are to be used. Such a quantity of salt would itself occupy about 20 m$^3$.

However, since heat is to be supplied to and removed from the sorbent, in all practicable systems one or more heat-exchangers must in some way be incorporated into the sorbent layer used to form a heat accumulator. This means, therefore, that the actual volume of the thermal accumulator will be considerably greater than the volume of the salt alone. Considering merely the volume of salt specified above it can be seen that this leads to a major problem since in a practicable system it must be possible to supply heat to the heat accumulator to remove it therefrom in an economical and practical manner.

Since the sorption process generally requires the absence of foreign gases such as air, considerable problems arise with respect to supplying or removing heat to and from the sorbent in an economic manner without the overall volume of the thermal accumulator becoming too great. The problem becomes greater in proportion to the quantity of sorbent.

Another problem is that the sorbent material generally has relatively low thermal conductivity and that the total heat-transfer surface of the heat-exchanger must therefore be large in order to permit sufficient output both when storing and when extracting heat. If the heat accumulator is designed so that the sorbent is placed in one or more tanks in which a heat exchanger is located, so that heat can be supplied or extracted, there will be considerable stress in the tank walls caused by the pressure difference between the interior of the tank and the ambient atmosphere. The walls of the tank must therefore be dimensioned to withstand extremely high pressure differentials without rupturing which leads to enormous costs.

A two-tank system has already been proposed using a salt hydrate as sorbent and water as sorption medium, the sorbent tank consisting of a multitude of steel tubes filled with the hydrate. The tubes are connected together and also to the sorption tank containing water. This tube system, which is under greater reduced pressure, is immersed in a tank container a thermal transfer medium such as water. Upon discharging of this two tank thermal accumulator, water is sorbed by the salt and thus the salt is heated. The heat is conducted through the salt, out through the tube walls to the surrounding water. Thus in this case the sorbent tank with its heat exchanger consists of a tube system surrounded by an outer tank.

A simple calculation shows that even in this case a heat accumulator of this type would be enormously expensive. There are several reasons for this. One is that the tubes must be dimensioned to withstand the external pressure, having regard to the fact that the interiors of the tubes are at a very low pressure. Another is that a considerable length of tubing is required to ensure that all parts of the salt are sufficiently accessible for heat transfer. A third is that the material in the tube walls must have good thermal conductivity since they must be relatively thick in order to withstand the external pressure and yet heat must be readily able to pass through the tube walls. A rough estimate indicates that tubes having sufficiently thick walls to withstand the external pressure and having a sufficient expanse of heat-transfer surfaces with good thermal conductivity, made of steel for instance, would be very costly (several hundred thousand Swedish crowns) in material costs alone for seasonal storage of heat for a one-family house. A problem which is also inherent in the thermal accumulators described above is that, as known, hydrates swell and shrink during the cyclic sorbtion and de-sorbtion process. This means that difficulties are incurred in obtaining satisfactory thermal contact between the salt and the walls of the tubes, since spaces are often caused by the movement of the salt, particularly between salt and tube walls. Furthermore, if the tubes are packed tightly with the sorbent material the gas to be absorbed may be impeded in its flow due to the salt swelling.

OBJECT OF THE INVENTION

The object of the present invention is to provide a method of making a unit containing sorbent material in which the drawbacks and problems mentioned above are reduced or obviated.

SUMMARY OF THE INVENTION

According to one aspect of this invention there is provided a method of manufacturing a unit containing sorbent material for use as a thermal accumulator element, wherein a predetermined quantity of sorbent material is surrounded by a flexible, relatively thin casing, and the casing is brought into close abutment with the outer contours of the sorbent material inside the casing in order to obtain a rigid unit and to achieve good thermal conductivity between the casing and the sorbent material by maintaining the interior of the casing at a pressure substantially less than the pressure at the exterior of the casing, the casing being provided with at least one port for the flow of a gaseous substance to be sorbed and desorbed by said sorbent material.

The thus manufactured unit will have substantially predetermined dimensions, and will be rigid and of stable configuration. The pressure differential between the interior of the casing and the exterior of the casing will ensure that a uniform isostatic inwardly directed pressure is applied to the casing. The unit may be used in a heating, refrigerating or heat storage system that operates under low pressure.

Preferably the material used for the casing has such flexibility that during any alterations in volume of the sorbent material occurring upon sorption and desorption the casing maintains good contact with the adjacent parts of the sorbent material. The casing may be of metal foil, or a composite material formed of metal foil and a plastics material.

Initially the sorbent material may be in crystal form, granular form, or powder form. The sorbent may be pre-shaped by pressing the material to form substantially self-supporting sheets. For this pressing process the material may be combined with a binder. Alternatively a porous material may be used as carrier for the sorbent material, such as sheets of cellulose or paper. In one method at least two pre-shaped sorbent sheets are enclosed in a common casing, and optionally channels or other means defining a passage for the flow of a sorbtion medium, such as a gaseous sorption medium, may be provided between the sheets.

In one embodiment the sorbent material is enclosed in a plurality of casing parts which are fitted together so that they communicate with each other. Thus, the sorbent may be hermetically sealed in a plurality of casing parts that are joined together, wall sections of adjacent casing parts being joined together and provided with inter-communicating passages therein.

Preferably spaces are provided adjacent the casing through which an outer gaseous or liquid medium can flow for the supply or removal of heat from said unit.

According to another aspect of this invention there is provided a unit containing sorbent material for use as a thermal accumulator element, wherein the sorbent material is tightly surrounded by a flexible, relatively thin casing having low gas permeability, the casing being provided with at least one port for the flow of a gaseous substance to be sorbed and de-sorbed by the sorbent material, the interior of the casing containing the sorbent material being maintained at a pressure substantially less than the pressure at the exterior of the casing, the sorbent material forming a rigid body. The unit may be used in a heating, refrigerating or heat storage system that operates at a low pressure.

Preferably the casing consists of a foil such as plastics foil, metal foil or a composite foil material of metal foil and plastics.

The sorbent may comprise a plurality of elements of sorbent material hermetically enclosed in a common casing composed of several casing parts, the wall sections of adjacent casing parts being joined together in zones, in which passages are arranged which communicate between the casing parts for the flow of said gaseous substance to be sorbed and de-sorbed.

Preferably the sorbent material is provided with through-flow channels arranged to cooperate with said passages for the flow of said gaseous substance.

In one embodiment at least one of the said joined casing parts consists of a trough.

Alternatively the casing parts may consist of material in hose form.

Preferably the casing parts with enclosed sorbent elements are arranged together so that spaces existing between the walls of the adjacent casing parts provide through-flow channels for an outer gaseous or liquid medium to supply or remove heat from said unit.

Advantageously the spaces serving as through-flow channels for an outer gaseous or liquid medium for the supply or removal of heat from said sorbent units are mutually intersecting grooves formed on the said adjacent casing parts, although alternatively the spaces are formed by spacers arranged between adjacent casing parts.

Preferably at least some of the spacers are gas-tightly connected between adjacent casing parts in the zones where the casing parts are joined together, the spacers defining said communicating passages.

Advantageously each casing part consists of a trough provided with a lid, at least one protrusion between the lid and the bottom of the next adjacent trough serving as a spacer. Said protrusion may be provided with an opening therethrough, the adjacent casing part being provided with an aligned opening to form said communicating passage.

Advantageously the communicating passage communicates with distribution means provided with openings which are arranged in the sorbent material. The distribution means may each extend through a respective casing part and thus communicate with openings formed in the opposite sides of the casing part. The distribution means may be designed to adjust to dimensional alterations in the casing part by means of corresponding alterations in their length. Thus said distribution means comprise telescopic parts which can be pushed into each other, although a distribution means of bellows like configuration may be used. The cross-sectional area of the distribution means may be substantially constant during alteration in length.

Said casing may contain a pair of elements of sorbent material, which are separated by means defining flow passages for said gaseous medium to be sorbed and re-sorbed.

Preferably a plurality of said pairs of elements are provided within the casing, the elements being separated by sheets of thermally conductive material which extend to said casing. Said sheets of thermally conductive material may be in thermal contact with a pipe passing through the unit, which pipe is adapted to carry a heat transfer medium.

It will be appreciated that units in accordance with the invention can be advantageously used in thermal accumulations intended for long-term storage of heat where the thermal accumulations have large dimensions. However, units in accordance with the invention can also be utilised with advantage in refrigeration processes where high output is required in relation to the volume of sorbent material i.e. where the cycle time between sorption and desorption is brief in relation to the cycle time of a long-term storage process for instance. The overall volume of a thermal accumulator using units in accordance with the invention is not very much greater than the volume of the solvent material itself.

BRIEF DESCRIPTION OF DRAWINGS

The invention will be described more fully in the following description given with reference to the accompanying drawings, in which:

FIG. 8 is a side view of yet another embodiment of a package produced in accordance with the invention;

FIG. 9 shows a vertical section through a member for use in forming the package shown in FIG. 8;

FIG. 10 is a section through a body composed of a number of packages as shown in FIG. 9, each enclosing a sorbent blank, and forming a unit;

FIG. 11 is an enlarged sectional view of part of two plates of sorbent material as shown in FIG. 10;

FIG. 12 is a diagrammatic plan view of part of the plates shown in FIG. 11;

DETAILED DESCRIPTION OF PREFERRED EMBODIMENTS

In this specification the term "shaped body" is used to mean sorbent material tightly enclosed in a casing. The casing may consist of a number of casing parts, each of which encloses a separate sorbent blank. Each such casing part with a sorbent blank is known as a "unit" and a number of these units can be combined to form a shaped body.

Figure 1:
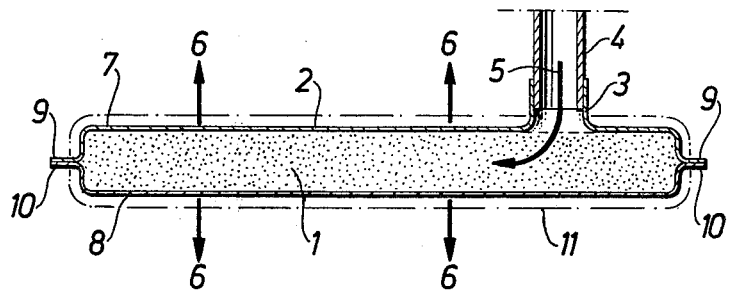
FIG. 1 is a section through a package produced in accordance with the invention.

Referring to FIG. 1, a sorbent 1 in the form of a powder or crystals, for instance, of a salt hydrate, is enclosed by a thin, flexible casing 2 of plastics material foil or a thin metal foil, for example. The sorbent material and the surrounding casing 2 form a unit which comprises a heat accumulator or part of a heat accumulator. The casing 2 consists of two trough-shaped parts 7 and 8 which have respective flanges 9 and 10 abut the open mouths thereof. The flanges 9 and 10 about each other and are joined by means of heatsealing, for example, in order to provide a sealed casing. A tubular spigot 3 is sealingly connected to the casing 2 to communicate with the interior of the casing and may be connected to a supply member 4 for the sorption medium in gaseous form. The arrow 5 indicates the direction of movement of the sorption medium in the sorbent 1. As the sorption medium is sorbed heat is emitted from the unit, as indicated by the arrows 6. As can be seen from FIG. 2, the unit of FIG. 1 is rectangular.

Figure 2:
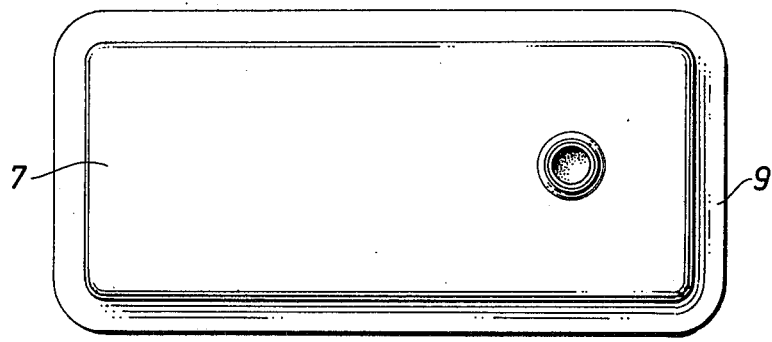
FIG. 2 is a view from above of the package in FIG. 1.

Surprisingly, it has been found that a package consisting, for instance, of a powder or crystals of a hydrate, ammoniate or zeolite, and a gas-tight, thin, flexible casing such as that shown in FIGS. 1 and 2, forms a substantially rigid unit when air has been removed from the unit by means of a vacuum pump. After evacuation the package effectively forms a rigid plate which is easily handled and which, while retaining its shape, can be located in the desired position with respect to other similar packages which together form a heat accumulator. Thus, provided that the sorbent and sorption medium are able to operate under low pressure, such a package can be made to retain its rigidity and thus its shape during both sorption and desorption, i.e. as long as the pressure maintained within the package is substantially less than atmospheric pressure.

The reason that the individual loose grains of sorbent can form a rigid unit when combined with a casing as described above is believed to be as follows. Since a partial vacuum prevails in the package in relation to the surrounding external pressure, such as atmospheric pressure, and since the walls of the casing are flexible, the casing is pressed against the crystals or grains of powder causing the crystals or grains of powder to be mechanically bound to each other. The effect is surprising and if the difference between the pressure applied to the exterior of the package and internal pressure is great it is possible to obtain and extremely rigid package which will permanently retain its shape. When using a salt hydrate on a sorbent and water vapour as a sorption medium for instance; the internal pressure in the package will be, as mentioned above, in the order of magnitude of 6-10 torr, and if such a package with such an internal pressure is placed in a normal atmosphere or in a water tank an extremely good result is obtained since the pressure differential across the flexible casing is extremely great. In this way thermal accumulators or thermal accumulator parts can be formed in a simple and inexpensive manner having dimensions which can be predetermined, in the form of one or more plates, for instance with given thickness height and width.

As mentioned above, the flexibility of the casing is of considerable importance to achieve the desired effect. The casings can naturally be made out of many different materials depending on the conditions to which the packages are to be exposed. Suitable materials for flexible casings are plastics material, foils, aluminium foil, and composite materials of metal foil and/or plastics.

The flexible casing is not only intended to separate the sorbent from a surrounding medium and to contribute to fixing the enclosed sorbent in place. Since during the sorption process heat must be removed from the sorbent and during desorption heat must be supplied to the sorbent, the casing must also have good thermal conductance. Since the casing is thin, and flexible, good thermal conductance is obtained even with plastics material which is not usually considered as having particularly good thermal conductivity. The reason that good heat condition is obtained across the thin material, particularly since due to the flexibility of the material and the pressure exerted from the outside, the material is brought into intimate contact with the sorbent material within the package.

As mentioned earlier, the volume of sorbent material often alters when desorption or sorption takes place, i.e. the sorbent material may shrink or swell, respectively. This applies particularly to sorbents in the form of hydrates and ammoniates. It is for this reason that the package, which is rigid in itself, has flexible walls. Thus the sorbent can be permitted to change its dimensions while still maintaining good contact between casing and sorbent.

When the sorbent material swells during sorption, the flexible walls of the casing are pushed out correspondingly, and when the sorbent material shrinks, the walls follow its contours, retaining the substantially same contact pressure due to the pressure differential between the inside of the unit and the surroundings. If the casing is made of a thin elastic material the sorbent will be subjected to an isostatic pressure, that is to say pressure exerted in towards the sorbent material, which is equal in all and inward directions. The contour 11 indicated in broken lines in FIG. 1 illustrates alterations in volume caused by sorption.

In the embodiment of the invention described above, therefore, the sorbent material and casing forms a self-supporting structure which will withstand the pressure arising due to the pressure differences between the interior and the exterior of the casing. The casing also serves as a membrane to separate the inner space with the sorbent from the surroundings. When choosing the material for the casing, therefore, it must be observed that not only must it be flexible and relatively thin as mentioned earlier, it might also be gas-tight so as to prevent, as far as possible, diffusion between the surroundings and the inner space within the casing.

It will be appreciated that, the package shown in FIGS. 1 and 2 can be simple and inexpensive to manufacture and can be used as a thermal accumulator or thermal accumulator part. It will also be appreciated that the sorbent material of the package can be connected in a simple manner to a sorption medium tank by means not shown in FIGS. 1 and 2. A shaped body formed from one or more packages as described above can be given suitable dimensions with respect to the requirements for heat extraction or heat supply. The shaped body can be made extremely inexpensively since the sorbent material itself primarily forms the supporting structure to withstand the applied external pressure and since the casing can be mass produced out of a thin and expensive material. If a number of shaped bodies are to constitute parts of a thermal accumulator they can easily be combined to form a heat accumulator in which each part constitutes a vane, for instance. The arrangement of space between the vanes allows a suitable medium such as air or water to be passed between the vanes for the supply or extraction of heat. Since the accumulator parts are flat the total volume of the parts can be kept low.

Figure 3:
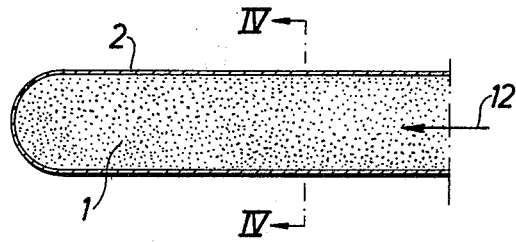
FIG. 3 shows a longitudinal section through a second embodiment of a package produced in accordance with the invention.
Figure 4:
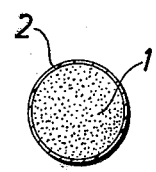
FIG. 4 is a section along the lines IV—IV in FIG. 3.

FIG. 3 shows a second embodiment of the invention. In this embodiment the sorbent 1 is of cylindrical configuration and is surrounded by a thin, elastic, tubular casing 2. This casing 2 may consist of a thin plastics material hose, for instance. The arrow 12 indicates the direction of movement of the sorption gas in the sorbent material during the sorption process. FIG. 4 shows the cylindrical body of FIG. 3 in cross section. In this second embodiment, if the pressure differential between the outer atmosphere and the space within the casing 2 is sufficiently great, an extremely rigid unit is obtained in the form of rod. A number of such rods can be joined to each other. Since the cylindrical bodies are rigid a large number of them can be positioned close together to form one or more thermal accumulator parts. Since the cylindrical bodies are placed close together the gross volume i.e. the overall exterior volume of the accumulator will be relatively moderate in relation to the theoretical volume, i.e. the volume of the sorbent material 1.

Figure 5:
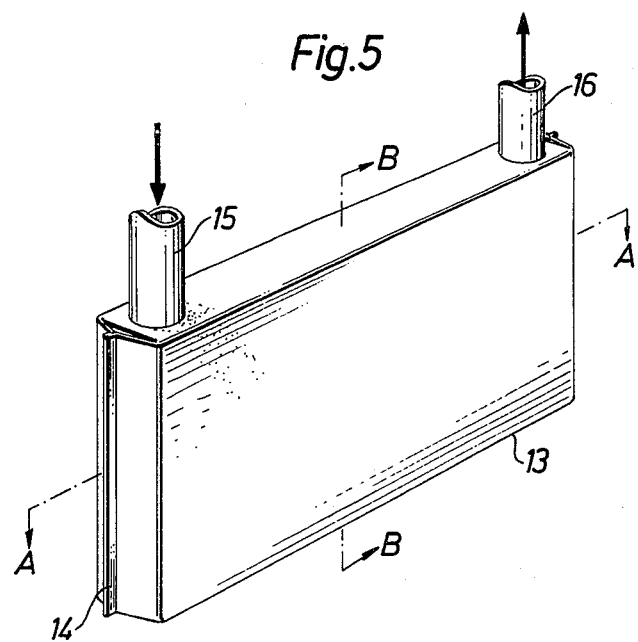
FIG. 5 is a perspective view of another embodiment of a package manufactured in accordance with the invention.
Figure 6:
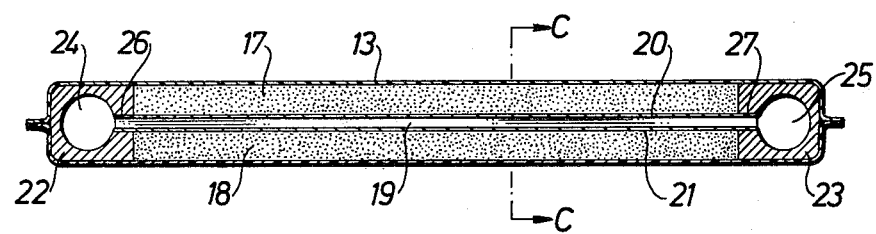
FIG. 6 is a section along the line A—A in FIG. 5.

FIG. 5 shows another embodiment of the invention in perspective. The illustrated unit consisting of casing 13 with enclosed sorbent, is in the form of a rectangular body. The casing 13, suitably consisting of a thin, flexible plastics material, possibly combined with a metal foil, is sealed in a gas-tight manner. In FIG. 5 this is illustrated by the sealing ribs 14. An inlet 15 for the sorption gas and an outlet 16, for connection during evacuation, for instance are provided. FIG. 6 shows a section through the package of FIG. 5 taken along line A—A. The sorbent material consists of two plate-like blanks 17 and 18 separated from each other by means of a corrugated spacer 19 which may consist of sheet metal or relatively stiff plastics material. On both sides of the spacer 19, between the blanks 17 and 18, and the spacer 19 there are thin layers 20,21, of porous material. At each end of the body formed by the sorbent blanks 17 and 18 is an end piece 22 or 23, provided with vertically extending channels 24,25, respectively, to which the inlet part 15 and outlet part 16 in FIG. 5 are connected. Slots 26,27, respectively are arranged in the end pieces 22 and 23, respectively, communicating with the channels 24 and 25 and with the space between the blanks 17 and 18. The dimensions are such that the spacer 19 at each end is inserted into the slots 26 and 27 to ensure communication between the inlet 15, the outlet 16 and the space between the blanks 17 and 18. The assembly of the sorbent with the end pieces and spacer is surrounded by the thin, flexible casing 13. The pressure within the casing is maintained at a level which is less than the pressure on the exterior of the casing.

Figure 7:
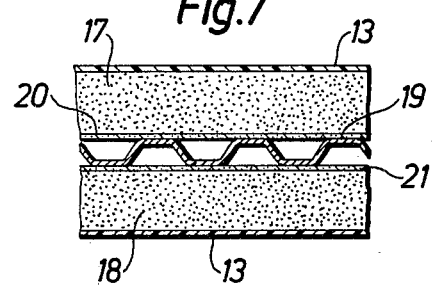
FIG. 7 is an enlarged section along the line C—C in FIG. 6.

FIG. 7 shows the unit of FIG. 6 in section along the line C—C. It can be seen that longitudinal channels are formed between the sorbent blanks 17 and 18 since these are separated by the corrugated spacer 19. During sorption the sorption medium, for example the sorption gas, is supplied through inlet 15, hollow 24 and on via the slots 26, 27 into the channels formed by the spacer 19. The gas is then sorbed by the sorbent blanks 17 and 18 as it passes through the porous layers 20,21. These porous layers are provided to prevent the granular or powdered sorbent from filling the said channels. The layer 20 must be sufficiently rigid to withstand the applied external pressure.

In order to achieve efficient manufacture of the unit as shown in FIGS. 5, 6 and 7 it has proved advisable to use a sorbent material, such as a hydrate, in the form of separate sheets. Such sheets can be made by compressing the powdered material under a suitable pressure. It has been found that most sorbent materials, including hydrates, can be compressed to form sheets, even without the addition of binder in some cases, under certain conditions. With the use of such compression it is possible to obtain a sorbent material which can be handled, so that it can be positioned without difficulty in the casing. When the casing 13 has been applied to surround hermetically the sorbent and the air initially within the casing has been thoroughly evacuated, however, no such demands with respect to strength are placed upon the sorbent sheet. Should cracks appear, for instance, the separate parts of the sheet will be held together due to the prevailing pressure on the exterior of the unit which is greater than the pressure on the interior of the unit and thus the body and the unit will remain rigid.

As mentioned earlier, the sorbent blanks 17 and 18 will expand during sorption, particular if hydrate or ammoniate is used. Due to the insertion of the spacer 19 into the slots 26 and 27, an expansion of the blanks 17 and 18 in the longitudinal direction can be tolerated since the spacer 19 can slide freely to and fro in the slots. Thus the slots will not close up.

In this connection it may be mentioned that sorbent blanks may be used in embodiments of the present invention which blanks have been formed by impregnating a porous carrier material as described in Swedish Patent Application No. 77 14 224-8.

Alternatively a sorbent material which has been mixed with other components such as fibres or binder for various reasons such as to increase the strength of the body during handling may be used. However, in all cases it is primarily the sorbent material itself, possibly in combination with the carrier material, which takes up the forces resulting from the pressure differential between the exterior of the casing and the interior of the casing. The problems associated with excessively thick or strong walls are thus eliminated.

FIG. 8 shows another embodiment of the invention. A trough of a thin material, for instance in the form of hot-moulded plastics material foil, is filled with a sorbent material. A lid 29 in the form of a flat, flexible foil is sealed against the flanges 30 of the trough 28. This embodiment permits a shaped body to be built up in a practical and inexpensive manner, consisting of a large number of combined units, each unit consisting of a filled trough as shown in FIG. 8.

FIG. 9 shows how each casing part in a package made in this way will appear in cross-section. The trough 28 is filled with sorbent 31 which may consist either of sorbent material in loose powder form or of more or less compressed sheets. A flat lid 32 is secured to the bottom of the trough 28. Connection channels 34 and 35 are arranged between the lower surface of the lid 32 and the interior of the trough 28. The lid 32 is preferably secured to the trough 28 by means of heat-sealing 33, for instance, all round the connection channels 34 and 35.

The combination of such units as those in FIG. 9 to form a body serving as a thermal accumulator is illustrated in FIG. 10 and is performed as follows.

When a first casing part as shown in FIG. 9 has been filled with sorbent material, a similar casing part is placed on top of the first casing part. The flange 30 of the trough 28 of the first casing part is then welded together with the corresponding part of the lid 32 secured to the bottom of the second casing part. Thereafter, another casing part is placed on top of the two first casing parts, now joined together, after which welding is again performed around the flange 30 and a further casing part is placed on the stack, and so on. Finally an uppermost lid, comprising merely a sheet of foil, is welded to the uppermost casing part.

FIG. 10 shows a thermal accumulator or thermal accumulator part according to FIG. 9. The uppermost lid has been provided with an inlet port 37. As can be seen, in this case the sorbent material is in the form of two flat plates 36a, 36b in each trough, i.e. the construction is similar to that shown in FIG. 6. However, this construction is optional and the sorbent material in each unit could completely fill the trough 28 as shown in FIG. 9. The properties of the sorbent material and the dimensions of the system are selected as desired. The arrow A in FIG. 10 shows the direction of flow of the sorption medium through the inlet channels of the system during sorption. The arrow B show how the sorption gas is sorbed into the sorbent plate 36a and 36b.

FIG. 11 shows in detail how two sorbent plates 35 and 36 in one of the troughs, corresponding to plates 36a and 36b shown in FIG. 10, may be arranged. Corrugated spacers 38 similar to those used in the embodiment shown in FIG. 7 are arranged between the sorbent plates, together with layers permeable to gas in the form of sheets of paper 39 and 40. If the sorbent plates 35 and 36 in FIG. 11 are composed of compressed powder or of elements produced by the impregnation of porous material such as paper, the lower and upper surfaces which face outwards may be provided with ridges and grooves 41,42,43,44. Since the surrounding casing is flexible it will, due to the considerable external pressure, follow the contours of the adjacent surface of the sorbent material. FIG. 12 shows how the ridges and grooves or any one surface of the sorbent plate run parallel to each other. If the ridges and grooves are arranged diagonally in the longitudinal direction of the material and the sorbent plates 35, 36, are oriented so that the ridges and grooves run as shown in FIG. 12 with the ridges and grooves on the top of the uppermost plate 36 extending in a direction inclined to that of the redges and grooves on the lower plate 35, a space will be formed between each lid 32 and the base of the next adjacent trough 28 if the plates in the stacked troughs are identical. Thus an external medium such as water can then be forced between the troughs to take up the heat at sorption or to supply heat at desorption to cause the sorbent to desorb.

In certain cases the corrugated spacers 38 of FIG. 11 may be omitted particularly if the sorbent material can be compressed so that sufficiently permanent ridges can be formed, the corrugated spacer material thus being replaced by such patterned surfaces.

Figure 13:
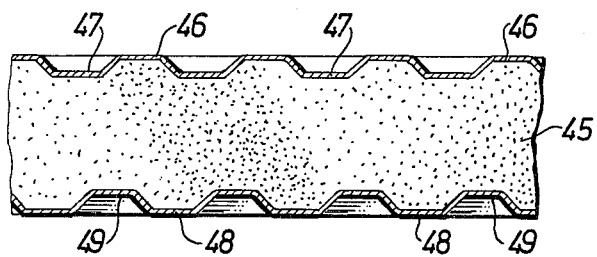
FIG. 13 shows schematically a side view of a pre-shaped sorbent material plate.
Figure 14:
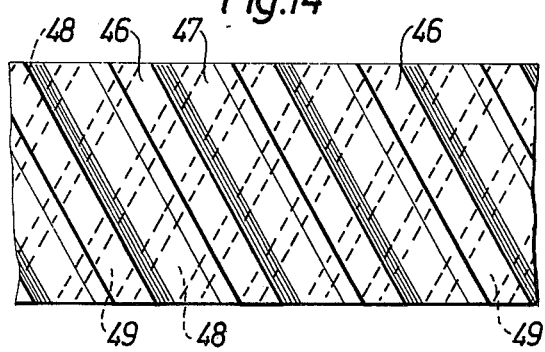
FIG. 14 is a view from above of the sorbent plate shown in FIG. 13.

FIG. 13 shows such a compressed and shaped sorbent material plate 45. Along the top surface of the plate are elevations 46 with recesses 47 between them. Similarly, elevations or protruding ridges 48 with corresponding grooves or recesses 49 are provided on the lower surface of the plate. The ridges along the top are parallel to each other but inclined in relation to the longitudinal direction of the sheet. In a corresponding manner the lower ridges 48 run parallel to each other but an angle in relation to the ridges 46. This is illustrated in FIG. 14 showing the detail according to FIG. 13 seen from above. Packages formed from such plates and an appropriate foil casing can be stacked close to one another while allowing a heat transfer medium to flow therebetween.

Figure 15:
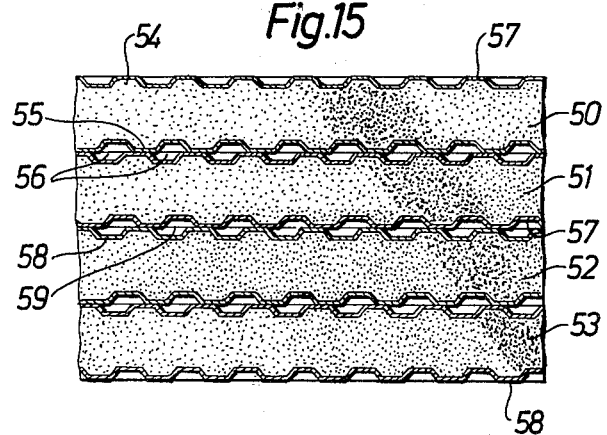
FIG. 15 is a section through a number of packages similar to those shown in FIG. 11 stacked one on top of the other.

FIG. 15 is a diagrammatic view of a stack of units of the type shown in FIGS. 8,9, and 10. The plates within the units of FIG. 15 resemble most closely those of FIG. 11, but as can be seen, the intermediate layers 38,39 and 40 have been omitted from FIG. 15 for the sake of clarity. A sheet of sorbent material within the uppermost unit is designated 50. It is provided at the top with ridges 54 and at the bottom with ridges 55. The sorbent sheet 50 is placed over a similar sorbent sheet 51, also provided with ridges at the top and bottom and also located within the uppermost unit. Since the ridges on sheets 50 and 51 have been arranged to intersect each other as shown in FIG. 14, spaces 56 are formed between the sheets 50 and 51. The sorbent medium, e.g. the sorbent gas can now be caused to pass through the spaces 56 during sorption. The sorbent sheets 50 and 51 are surrounded by the flexible casing 57 in the same manner as shown in FIG. 11 with regard to the sheets to form the uppermost unit. A second pair of sorbent sheets 52 and 53 have been arranged in the same way in relation to each other as the sheets 50 and 51, the sheets 52 and 53 forming a lower unit. They are enclosed by a casing 58 corresponding to the casing 57 of the upper pair of sorbent sheets. Spaces 59 are formed between the upper unit and the lower unit. Through these spaces 58 an external heat transfer such as water or a flow of air can be caused to pass to absorb heat from or to supply heat to the sorbent material.

It will readily be appreciated that there are other ways of rendering the sorbent material accessible to the sorption medium e.g. the sorption gas besides arranging channels in the plates as shown in FIGS. 6,7,10,11 and 15. For instance, the corrugated spacers in FIG. 7 might be replaced by inserts of a different type, for instance in the form of relatively stiff foam plastics material inserts which are permeable to the sorption medium. The arrangement of outer channels for the passage of a heat-transfer medium such as the channels 59 shown in FIG. 15 may also be replaced by inserts of various types, either inside the casings or between the casing parts. Such inserts may comprise ribs, protruberances or the like of plastics material.

Figure 16:
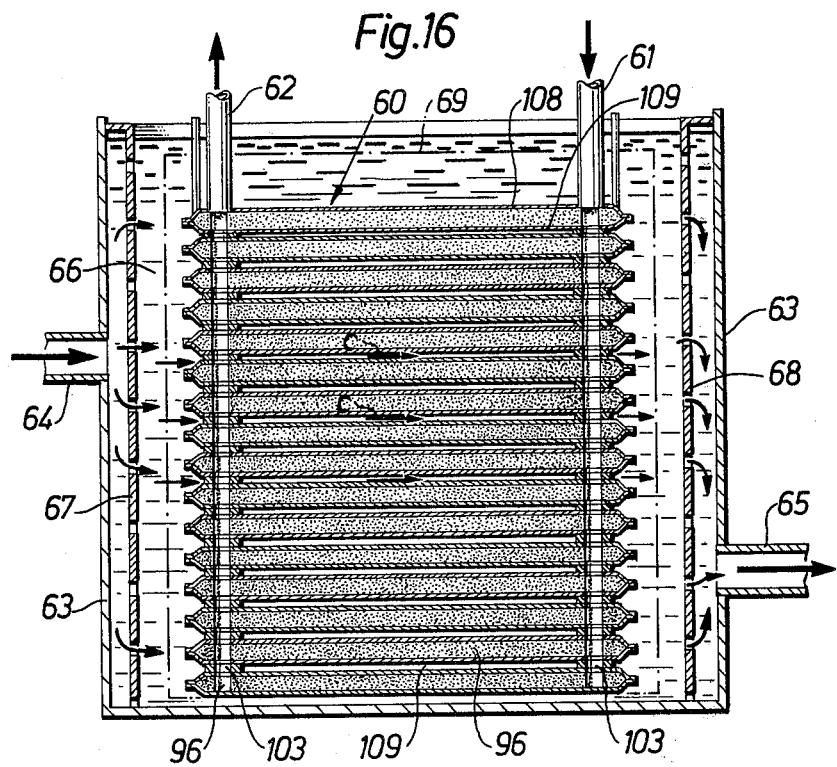
FIG. 16 shows a section through thermal accumulator arranged in a tank, said accumulator being formed by a shaped body produced in accordance with the invention comprising a number of packages i.e. casing parts, each containing a sorbent blank.
Figure 21:
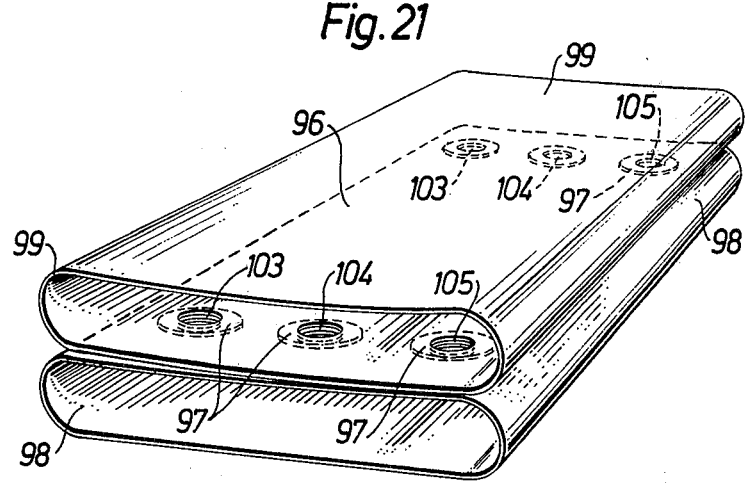
FIG. 21 is a perspective view of a stage in the manufacture of another embodiment of a thermal accumulator part constructed in accordance with the invention consisting of two casing parts, each of which enclosed a sorbent blank.
Figure 22:
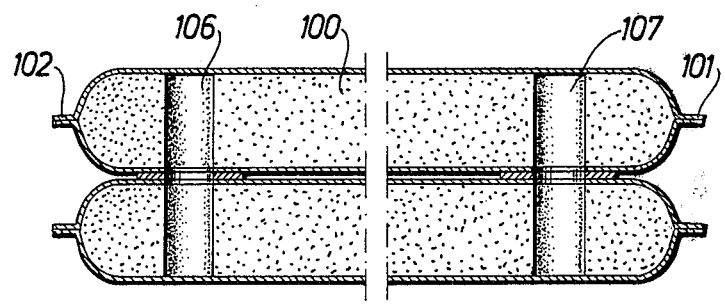
FIG. 22 shows a section through the completed accumulator part shown in FIG. 21.

FIG. 16 shows in principle how a complete heat store or a thermal accumulator can be arranged. A plurality of units of the type generally described above or of the type particularly described hereinafter with reference to FIGS. 21 and 22 are joined together to make a shaped body 60. An inlet 61 and an outlet 62 are provided at the top for sorption gas. The body 60, serving as heat accumulator, is immersed in liquid contained in an outer tank 63. An inlet 64 and an outlet 65 are arranged in the walls of the tank 63. The liquid 66 within the tank 63 is water or oil which acts as a heat transfer liquid. An inner partition 67 provided with perforations is arranged inside the inlet 64. In a corresponding manner a second partition 68 is arranged inside the outlet 65.

The heat accumulator 60 may be composed of a number of casing parts 96 communicating with each other. The term casing part applies here, for instance, to prefabricated tubular casing parts 96 shown in FIG. 21 and described more fully below, which are secured to each other by means of welding zones 97 and where openings 103-105 arranged within the welding zones provide communication between adjacent casing parts 96.

Thus, in the example shown in FIG. 16 casing parts 96 communicating with each other are provided, having a common casing 108. This arrangement of the units 96 provides spaces 109 between the casing parts—i.e. through-channels are formed through which a heat-transfer medium is caused to flow in the direction of the arrows C.

It is to be appreciated that such a construction of the accumulator enables a considerably larger surface of the sorbent material in the units to be exposed to an external medium than if the heat accumulator has been constructed as a single unit in the manner shown in FIG. 1, for instance During sorption heat is emitted from the sorbent material in the various units. When the heat transfer liquid is forced in though the inlet 64 it is distributed due to the perforated partition 67 and caused to flow in the direction of the arrows C between the various casing parts, whereupon the heat is absorbed. The liquid than passes through the partition 68 and out through the outlet part 65. The dimensions of the tank 63 are chosen so that the sorbent material can be permitted to expand in various directions during sorption. The broken line 69 shows the contour of the sorbent units when the material has expanded. If, for instance, water or oil is used as medium in the outer tank, the sorbent material will be kept substantially floating in the tank since the specific weight of the material, at least as far as hydrates are concerned, is only slightly above that of the water. No forces worth mentioning are therefore generated due to the weight of the accumulator 60 although the accumulator 60 may be of considerable height.

In the description process the liquid in the tank 63 will be caused to supply heat to the sorbent material.

As mentioned earlier, the apparatus described above may be used for seasonal storage of solar energy, amongst other things. In this case one or more heat accumulators as shown in FIG. 16 may be connected together. During sorption, i.e. discharging of the sorbent layer, the heat developed is removed from each tank and conducted to suitable heating arrangements. Upon desorption, i.e. dessication of the sorbent material, which takes place in the summer, heat is supplied through the medium in the tank 63 from heat collected by solar panels.

Figure 17:
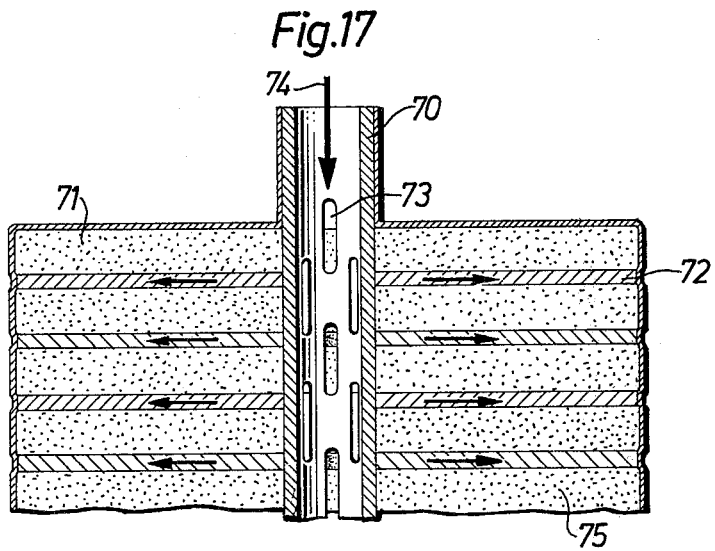
FIG. 17 shows a section through another embodiment of part of a thermal accumulator part in accordance with the invention.

FIG. 17 shows an embodiment in which the sorption medium i.e. a gas, is supplied to the body through a central pipe 70. The sorbent sheets 71 are separated by inserts 72 consisting of material pervious to the sorption medium gas. A number of slits 73 are provided in the central pipe. During sorption the gas enters from above in the direction of the arrow 74 and passes through the slits 73, and flows through the pervious inserts 72 to be absorbed in the sheets 71. The body has a gas-tight, flexible casing 75. During desorption heat is supplied externally and the warm heat transfer fluid passes adjacent the casing 75 and heats up the sorbent sheets 71. The described gas passes through the inserts 72 and then through the central pipe 74.

Figure 18:
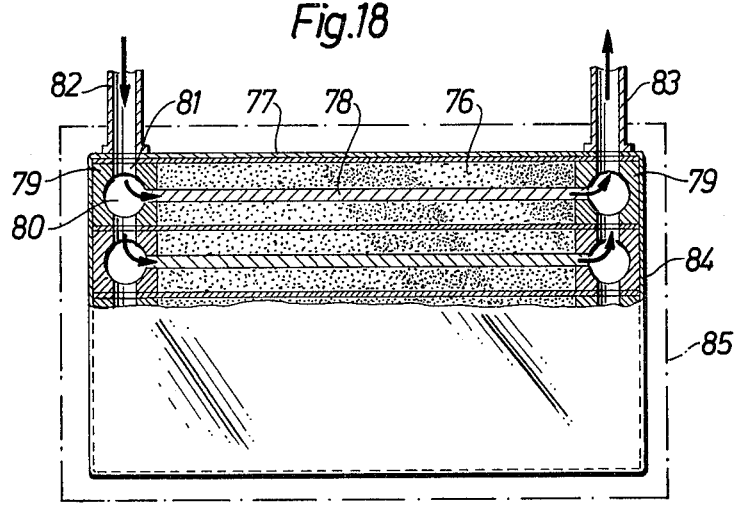
FIG. 18 shows a section through yet another embodiment of a thermal accumulated part in accordance with the invention.
Figure 19:
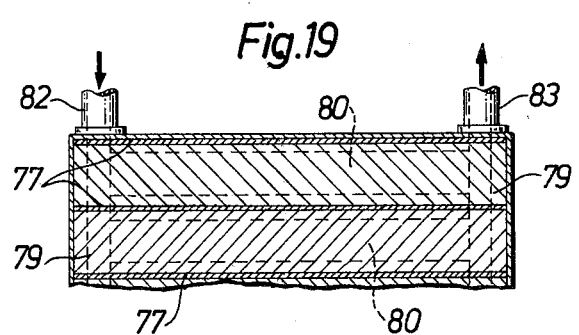
FIG. 19 is an elevational view of part of the accumulator part shown in FIG. 18, seen from the side.

FIG. 18 shows yet another embodiment of the invention. A number of sorbent sheets 76 are stacked one on top of the other in pairs. Above and below each sorbent sheet pair is a plate 77 of heat-conducting material. Between the sorbent sheets of each pair is a porous material 78 pervious to the sorbent medium, e.g. the sorbent gas. Each pair of sorbent sheets is provided at each end with an end piece 79. In the end piece is a channel 80 extending in horizontal direction connecting the zone containing the porous material 78 to a channel 81 which extends in a vertical direction through the end piece. The end pieces are stacked one on top of the other. The plates 77 of heat conducting material extend over the end pieces and are provided with apertures aligned with the channels 81 to provide a vertical connection through all the end pieces and the plates 77 at each end of the body. The vertical connections are attached to an inlet 82 and to an outlet 83. A gas-tight, flexible, thin casing 84 surrounds the described assembly. The dotted line 85 illustrates the dimensions of the body after sorption if a sorbent which expands is used. FIG. 19 shows a detail of the same shaped body seen from the side illustrating that the heat conducting plates 77 extend to the side of the assembly to conduct heat from the centre of the assembly to the sides and vice versa.

It has been found that even if a material is used for the sorption porcess which has stable dimensions and thus does not change size or shape during the sorption process, extremely good thermal contact is obtained between the plates 77 and the sorbent material 76 during the sorption and desorption processes due to the prevailing isostatic pressure, that is to say the inwardly directed pressure that acts in all directions on the casing parts. During a full sorption-desorption cycle different temperatures prevail, resulting in movement in both the sorbent material and the end pieces and plates. This might lead to a deterioration in thermal contact. However, this problem is not significant in embodiments of the invention because of the effect of the above mentioned isostatic pressure.

If heat is supplied externally the heat passes through the casing 84, through the end pieces 79 which are of a heat-conducting material, and through the heat-conducting plates 77. The effective heat-transfer surface to the sorbent sheets 76 will in this way be extremely large. The gaseous sorption medium is conducted away through the porous sheets 78 and out through the channel 80 and outlet 83.

Figure 20:
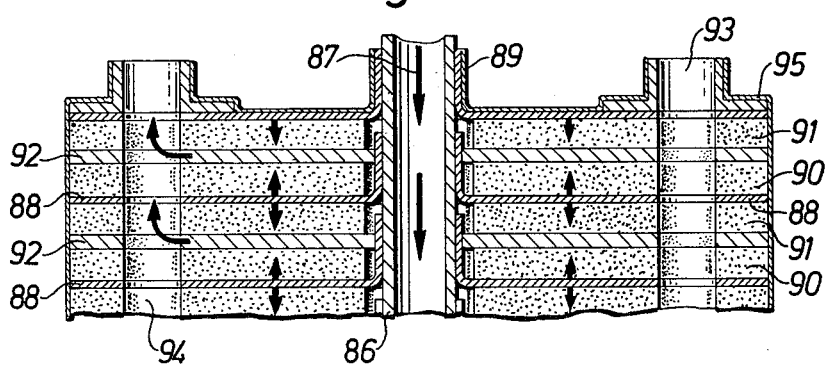
FIG. 20 shows in section a part of another embodiment of a thermal accumulator part in accordance with the invention.

FIG. 20 shows an embodiment in which heat is supplied through a central pipe to the body and a gaseous sorption medium is supplied and removed through other channels arranged inside the body. Heat is supplied through the central metal pipe 86, for example by passing hot water through the pipe 86, in the direction of the arrow 87. A number of heat-conducting thin metal plates 88 are in thermic contact with the central pipe 86 by means of flange-like arrangements 89. Pairs of sorbent plates 90 and 91 are located between the metal plates 88. Between each pair of plates 90 and 91 is a porous material 92, pervious to gas. Channels 93 and 94 are arranged in vertical direction. These channels communicate with the gas-pervious layers 92. When heat is supplied through the pipe 86 it is conducted out through the plates 88 and thereafter to the sorbent plates 90 and 91. In this embodiment, thus, the heat conduction takes place primarily through the metal material. The heating of the plates 90 and 91, causes the gaseous sorption medium to be released and it is then conducted through the porous material 92 and collected in the channels 93 and 94 for removal. During sorption the gas is passed through the channels 93 and 94 and via the porous layers 92 to the sorbent material. The described assembly is surrounded by a flexible, gas-tight casing 95. The apparatus shown is particularly suitable if for some reason there is difficulty in supplying heat externally around the outer casing of the body. It is particularly suitable for use with a sorbent material which does not expand, such as zeolites, and in cases where extremely large heat-transfer surfaces are desired. This is particularly so if a high output is required in relation to the storage volume. This is often desirable in refrigeration processes. Due to the pressure difference that exists between the outer atmosphere and the inside of the described unit, extremely good thermal contact will be obtained between the sorbent sheets and the heat-conducting plates.

FIG. 21 shows another embodiment of a shaped bodies proposed according to the invention. Pre-fabricated tubular casing parts 96 are preferably used in this embodiment. To construct a body intended for use in a thermal accumulator, a number of such casing parts 96, in the example shown here two, are fitted together for instance by means of three welding zones 97 located spaced from each other at the two short sides 98 and 99 of the casing parts 96. A sorbent blank 100 of corresponding dimensions is then inserted in each of said casing parts 96, whereupon the short sides of the casing parts are welded along the flanges 101 and 102, for instance before or at the time of applying a partial vacuum to the interior of the unit. As can be seen particularly well in FIG. 22, it is possible, in an extremely simple manner, to achieve close communication between various casing parts by punching openings 103, 104 and 105 within each welding zone 97 to provide through-channels 106 and 107, respectively comprising an inlet and an outlet. A thermal accumulator container with an arbitrary number of units can thus be manufactured in an extremely simple manner.

Figure 23:
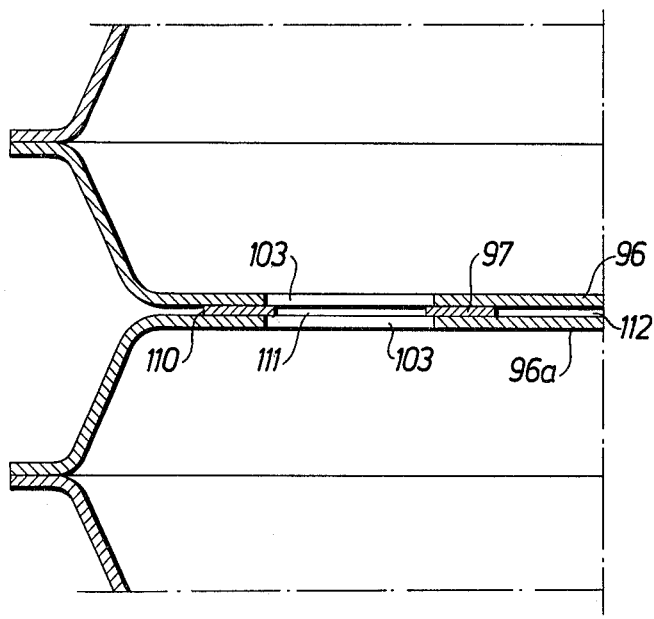
FIG. 23 shows a section through an accumulator part constructed in a manner similar to that shown in FIGS. 21 and 22, with the addition of spacers.

FIG. 23 shows a further development of the embodiment shown in FIGS. 21 and 22.

As shown in FIG. 23 spacers are located at the welding zones 97 between each pair of adjacent casing parts 96, 96a the arrangement being such that a passage is formed between the casing parts 96, 96a via the openings 103 and the internal passage 111 of said spacers.

FIG. 23 shows in detail how such spacers can be utilised in the arrangement shown in FIG. 21 and FIG. 22. An insert 110 with inner passage 111 is connected by welding, for instance, to provide gas-tight communication between the casing parts 96 and 96a so that the passage 111 is located substantially opposite the openings 103. A space 112 is thus formed between the units. The heat transfer medium can thus flow through the space 112.

Figure 24:
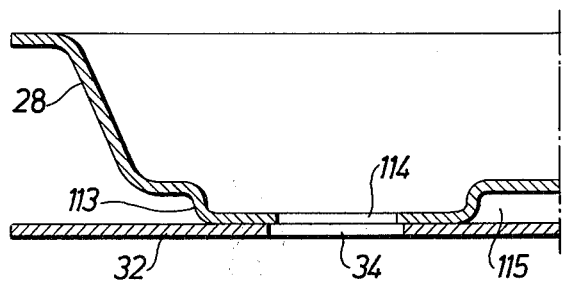
FIG. 24 shows a section through an accumulator part constructed in a manner similar to that shown in FIGS. 8 and 9, with the addition of spacers.

FIG. 24 shows in detail how spacers with an inner passage for the sorbent medium gas may also be arranged in the casing parts as shown in FIGS. 8 and 9. Dome-like protuberances 113 are formed in the trough 28 which is produced by hot-forming a thermoplastic. These protuberances 113 have openings 114. The lid 32 is secured in gas-tight manner to the protuberances 113. Each opening 34 of the lid is located substantially opposite to an opening 114 so that an inner passage for gas is formed. It will easily be understood that the height of the protuberances determines how large the space 115 between the units will be.

Figure 25:
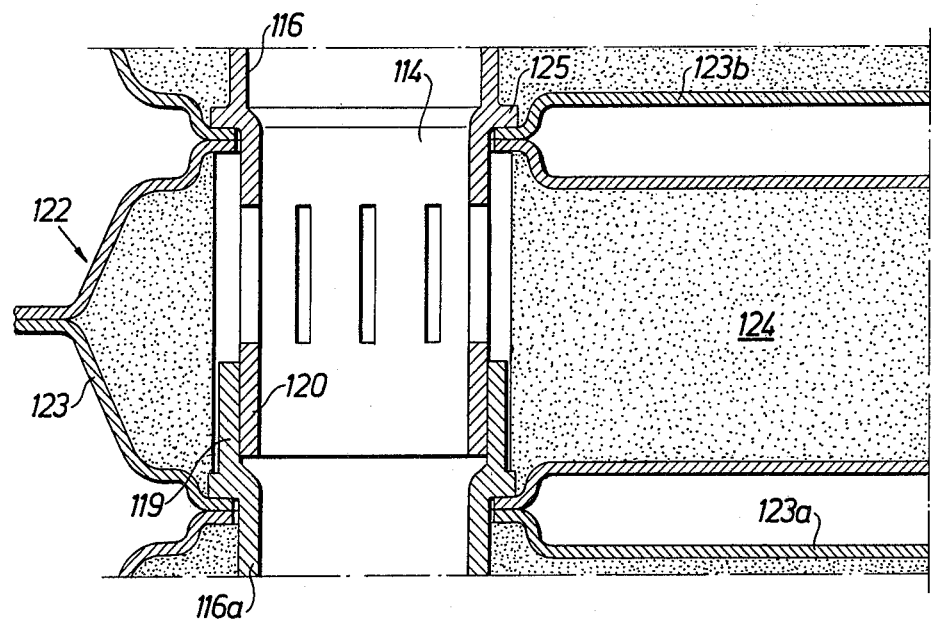
FIG. 25 shows a section through a part of a body with a distribution means arranged therein.
Figure 26:
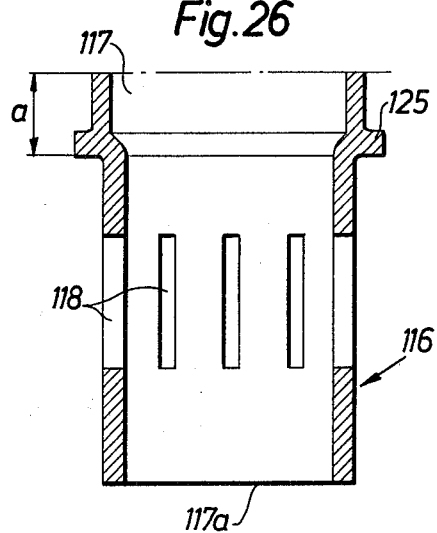
FIG. 26 shows a section through a distribution means as shown in FIG. 25.

FIG. 25 shows a unit 122 consisting of a casing part 123 similar to those described above containing sorbent material 124. The sorbent material is pre-shaped by pressing to form a sheet and is provided with holes for the distribution means described in more detail below. The casing part 123 communicates with adjacent casing parts 123a, 123b via openings 114. To achieve satisfactory distribution of the gaseous sorption medium into each unit 122, distribution means 116 is arranged between the openings 114 in the opposing sides of the casing part 123. Such a distribution means 116 is shown more clearly in FIG. 26. The distribution means 116 preferably has circular cross-section and is provided with inlet 117 and outlet 117a, located at opposite ends of the distribution means respectively. The distribution means 16 is also provided with lateral openings 118 and a protruding lateral flange 125 which is designed to secure the means close to an opening 114 in a respective casing part. This flange 125 is spaced a distance from one inlet or outlet 117, 117a of the distribution means and the part located between said flange 125 and the inlet or outlet 117 in the vicinity has a slightly larger cross section that the rest of the distribution means. The slightly larger part of the distribution means thus serves to receive telescopically the end of the next adjacent distribution means 116a in an adjacent casing part. In this way each distribution means is longitudinally displaceably fixed in a casing part and can thus by a suitable alteration in length of the telescopic connection adjust to changes in volume occurring due to pressure variations in the casing part, while still maintaining its distributing function. In the embodiment shown, therefore, a telescopic arrangement has been achieved between cooperating distribution means. This effect can of course also be achieved in many other ways, such as by designing the distribution means in the form of bellows.

To ensure satisfactory positioning of the sorbent material in each casing part it can be pre-shaped—for instance by pressing—so that it substantially exactly fits the specific shape of each casing part, thus following all the contours of the casing part—such as bulges, protuberances, ribs, etc. serving as spacers. The sorbent blank can thus be pre-shaped to flat blanks and provided with holes punched to receive said distribution means. Furthermore, the sides of adjacent casing parts may communicate with each other by means of an arbitrary number of protuberances acting as spacers, etc.

In all the above described embodiments the space containing the sorbent material is maintained at a reduced pressure, so that the surrounding casing is urged inwardly isostatically with an even pressure acting in an inward direction from all sides as a result of the action of the relatively higher ambient pressure on the exterior of said casing.

I claim:

1. A unit for use as a thermal accumulator element comprising a sorbent material, a substantially gas tight casing tightly surrounding said sorbent material, wherein said casing is formed of a flexible, relatively thin material having a low gas permeability and wherein said casing is provided with at least one port for admitting a gaseous substance into said interior to be adsorbed and desorbed by said sorbent material, and comprising means for maintaining the interior of the casing at a pressure substantially lower than the pressure at the exterior of said casing, said sorbent material and said casing thereby forming a rigid body, wherein the sorbent material comprises a plurality of elements of sorbent material hermetically enclosed in a common casing composed of several casing parts, the wall sections of adjacent casing parts being joined together in zones, in which passages are arranged which communicate between the casing parts for the flow of said gaseous substance to be sorbed and de-sorbed.

2. A unit according to claim 1, wherein said flexible material is one of a plastics foil, metal foil, and a composite foil material of metal foil and plastics.

3. A unit according to claim 1 wherein the sorbent material is provided with through-flow channels arranged to cooperate with said passages for the flow of said gaseous substance.

4. A unit according to claim 1, wherein at least one of the said joined casing parts consists of a trough.

5. A unit according to claim 1, wherein the casing is formed of a flexible material in one of foil and hose form.

6. A unit according to claim 1, wherein the casing parts with enclosed sorbent elements are arranged together so that spaces existing between the walls of the adjacent casing parts provide through-flow channels for an outer gaseous or liquid medium to supply or remove of heat from said unit.

7. A unit according to claim 6, wherein the spaces serving as through-flow channels for an outer gaseous or liquid medium for the supply or removal of heat from said sorbent units are mutually intersecting grooves formed on the said adjacent casing parts.

8. A unit according to claim 6, wherein the spaces are formed by spacers arranged between adjacent casing parts.

9. A unit according to claim 8, wherein at least some of the spacers are gas-tightly connected between adjacent casing parts in the zones where the casing parts are joined together, the spacers defining said communicating passages.

10. A unit according to claim 8, wherein each casing part consists of a trough provided with a lid at least one protrusion between the lid and the bottom of the next adjacent trough serving as a spacer.

11. A unit according to claim 10, wherein said protrusion is provided with an opening therethrough, the adjacent casing part being provided with an aligned opening to form said communicating passage.

12. A unit according to claim 1, wherein the communicating passages communicate with distribution means provided with openings which are arranged in the sorbent material.

13. A unit according to claim 12, wherein the distribution means each extend through a respective casing part and thus communicate with openings formed in the opposite sides of the casing part.

14. A unit body according to claim 13, wherein the distribution means are designed to adjust to dimensional alterations in the casing part by means of corresponding alterations in their lengths.

15. A unit according to claim 14, wherein said distribution means comprises telescopic parts which can be pushed into each other.

16. A unit according to claim 14, wherein the cross-sectional area of the distribution means is substantially constant during alteration in length.

17. A unit according to claim 1 wherein said casing contains a pair of elements of sorbent material, which are separated by means defining flow passages for said gaseous medium to be sorbed and re-sorbed.

* * * * *